United States Patent [19]

Crabb et al.

[11] Patent Number: 5,310,300
[45] Date of Patent: May 10, 1994

[54] APPARATUS AND METHOD FOR PACKING CONTAINERS ONTO A RACK

[75] Inventors: John A. Crabb, Yakima; Gary M. Garofano, Spokane, both of Wash.

[73] Assignee: R. A. Pearson Co., Spokane, Wash.

[21] Appl. No.: 830,667

[22] Filed: Feb. 3, 1992

[51] Int. Cl.5 .............................................. B65G 1/10
[52] U.S. Cl. .................................. 414/280; 198/408; 53/539; 53/537; 53/246; 414/786; 414/331; 414/278
[58] Field of Search ............... 414/331, 267, 680, 278, 414/280, 277, 281, 283, 273, 282, 274, 778, 754, 780, 786, 773; 198/408, 426, 409, 427, 430, 418.5, 432, 458, 433, 468.3; 53/544, 539, 537, 247, 246, 446, 448

[56] References Cited

U.S. PATENT DOCUMENTS

| | | | |
|---|---|---|---|
| 1,243,406 | 10/1917 | Hawthorne | 198/418.5 X |
| 1,276,898 | 8/1918 | Gallup et al. | 198/409 X |
| 2,861,670 | 11/1958 | Read et al. | 198/25 |
| 3,040,491 | 6/1962 | Viitanen | 53/537 X |
| 3,101,852 | 8/1963 | Pearne | 414/331 |
| 3,220,532 | 11/1965 | Vamvakas | 198/20 |
| 3,385,417 | 5/1968 | Dixon | 198/408 |
| 3,637,095 | 1/1972 | Kampfer | 414/331 |
| 3,643,780 | 2/1972 | Shimogaki et al. | 198/408 |
| 3,830,360 | 8/1974 | Graff et al. | 198/409 |
| 3,859,772 | 1/1975 | Thierion | 53/544 X |
| 3,924,762 | 12/1975 | Igel | 414/331 |
| 4,199,049 | 4/1980 | Vamvakas | 198/408 |
| 4,359,155 | 11/1982 | Brazeal | 198/409 |
| 4,634,333 | 1/1987 | Butterly, Jr. et al. | 414/331 |
| 4,773,810 | 9/1988 | Nishimura et al. | 414/331 |
| 4,929,140 | 5/1990 | Baker | 414/267 |
| 4,938,338 | 7/1990 | Crawford et al. | 198/408 |
| 4,988,252 | 1/1991 | Yamamoto et al. | 414/331 |
| 5,074,103 | 12/1991 | McDowell | 53/495 |

Primary Examiner—Michael S. Huppert
Assistant Examiner—James T. Eller, Jr.
Attorney, Agent, or Firm—Wells, St. John, Robets, Gregory & Matkin

[57] ABSTRACT

A rack packer for loading containers onto a rack comprises a loading station, a transfer station, an elevator, and a rack positioning means. The loading station receives and supports successive incoming rows of vertically oriented identical containers. The transfer station is positioned adjacent to the loading station. A starwheel at the transfer station is rotatably mounted about a transfer axis parallel to the successive rows of containers at the loading station. The starwheel has multiple sets of radial arms extending from the transfer axis to support individual containers of each row. The starwheel moves successive rows of containers from their vertical positions at the loading station upwardly to horizontal positions above the loading station. The elevator is located adjacent to the starwheel to receive multiple rows of horizontally oriented containers from the starwheel. The elevator vertically transports the rows of horizontally oriented containers to elevations corresponding to the elevations of supporting elements on a rack. The containers are then discharged into the awaiting rack. The rack positioning means is located adjacent the elevator. The rack positioning means and the elevator fix the position of the rack in alignment with the elevator.

30 Claims, 11 Drawing Sheets

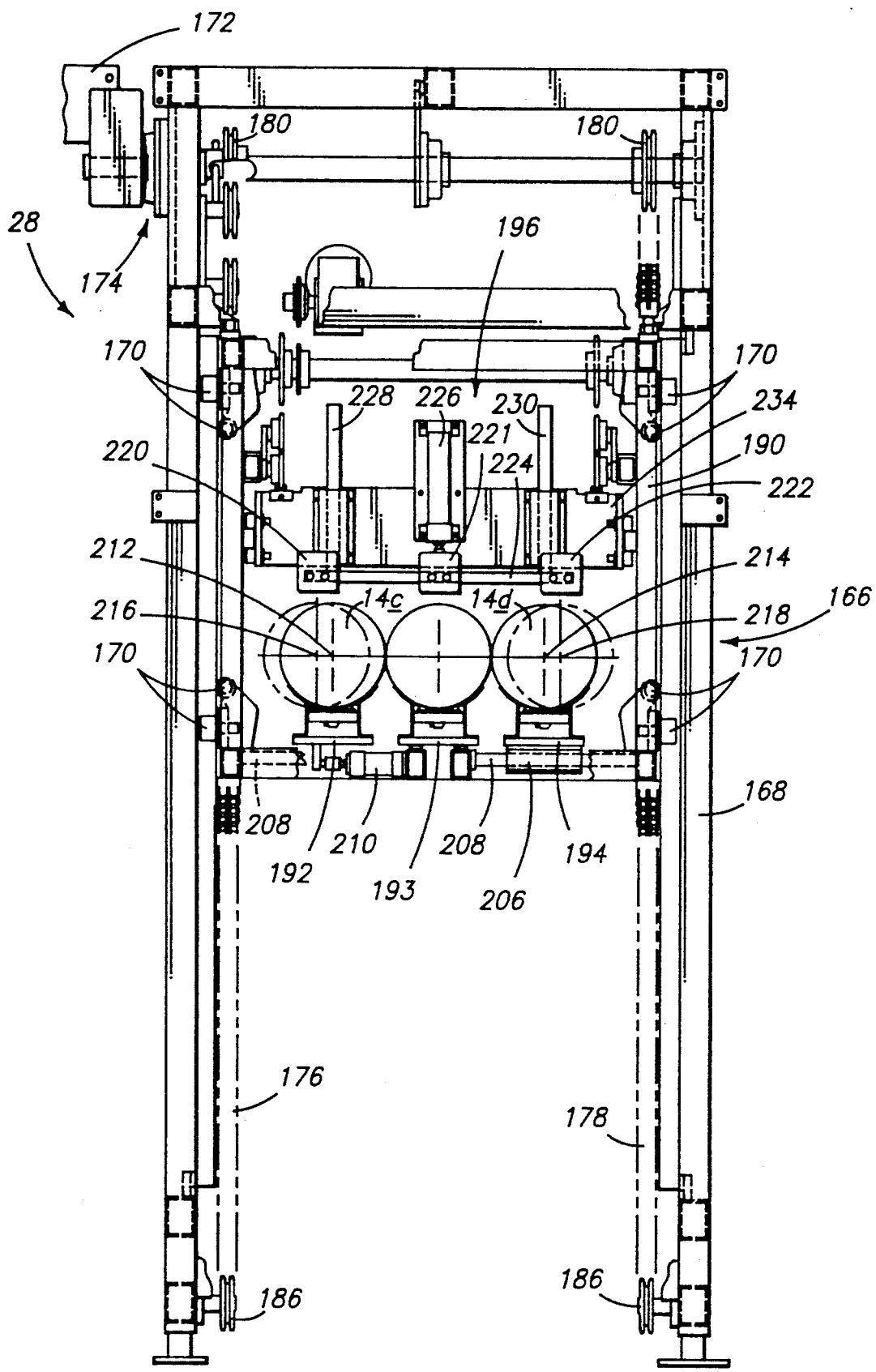

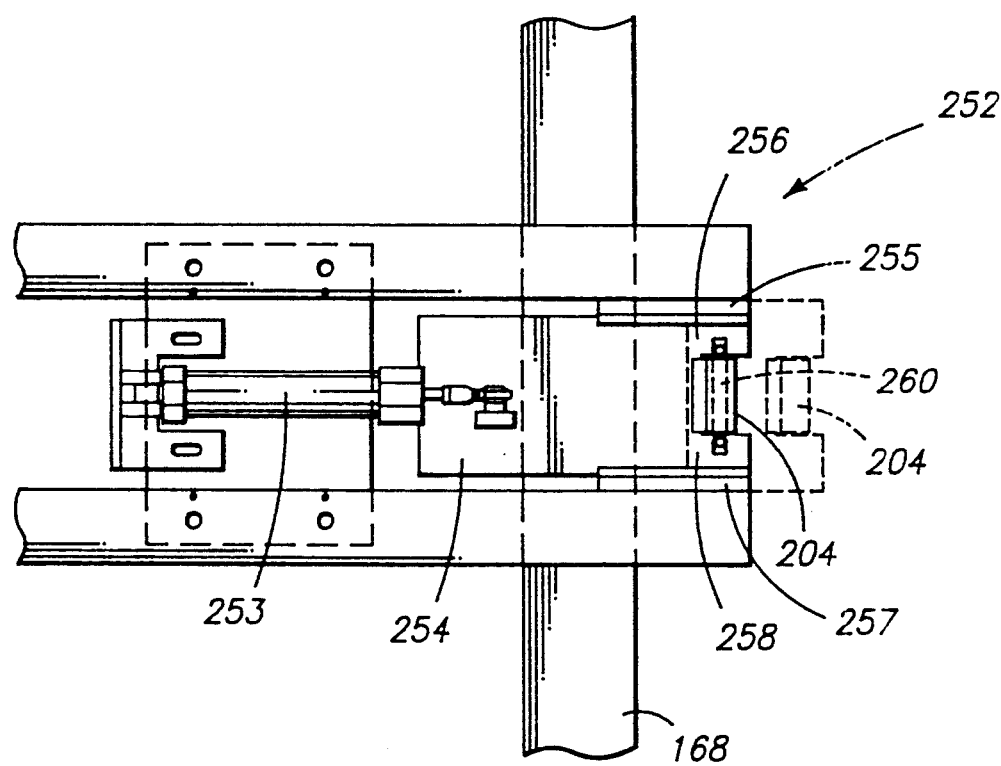

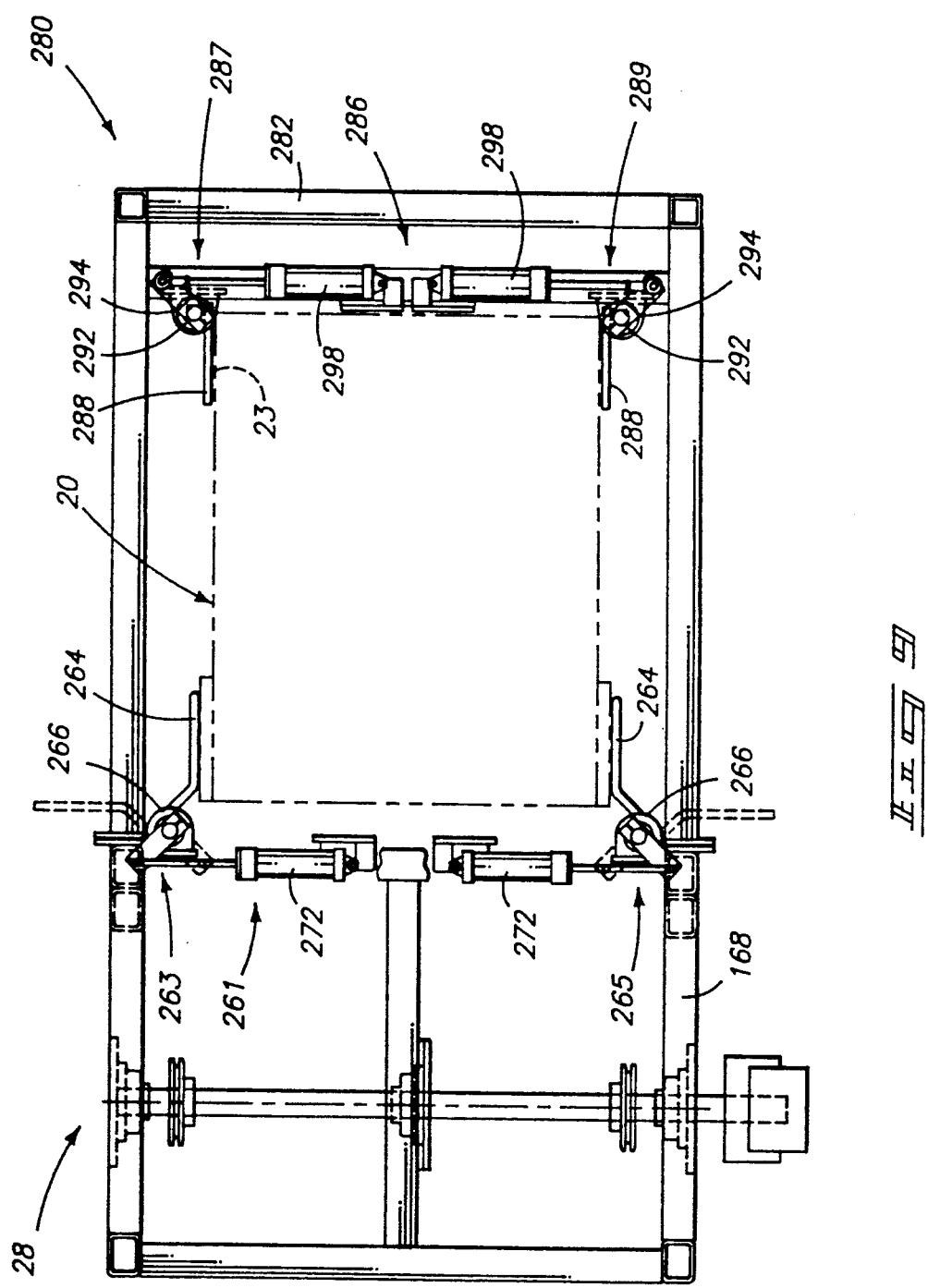

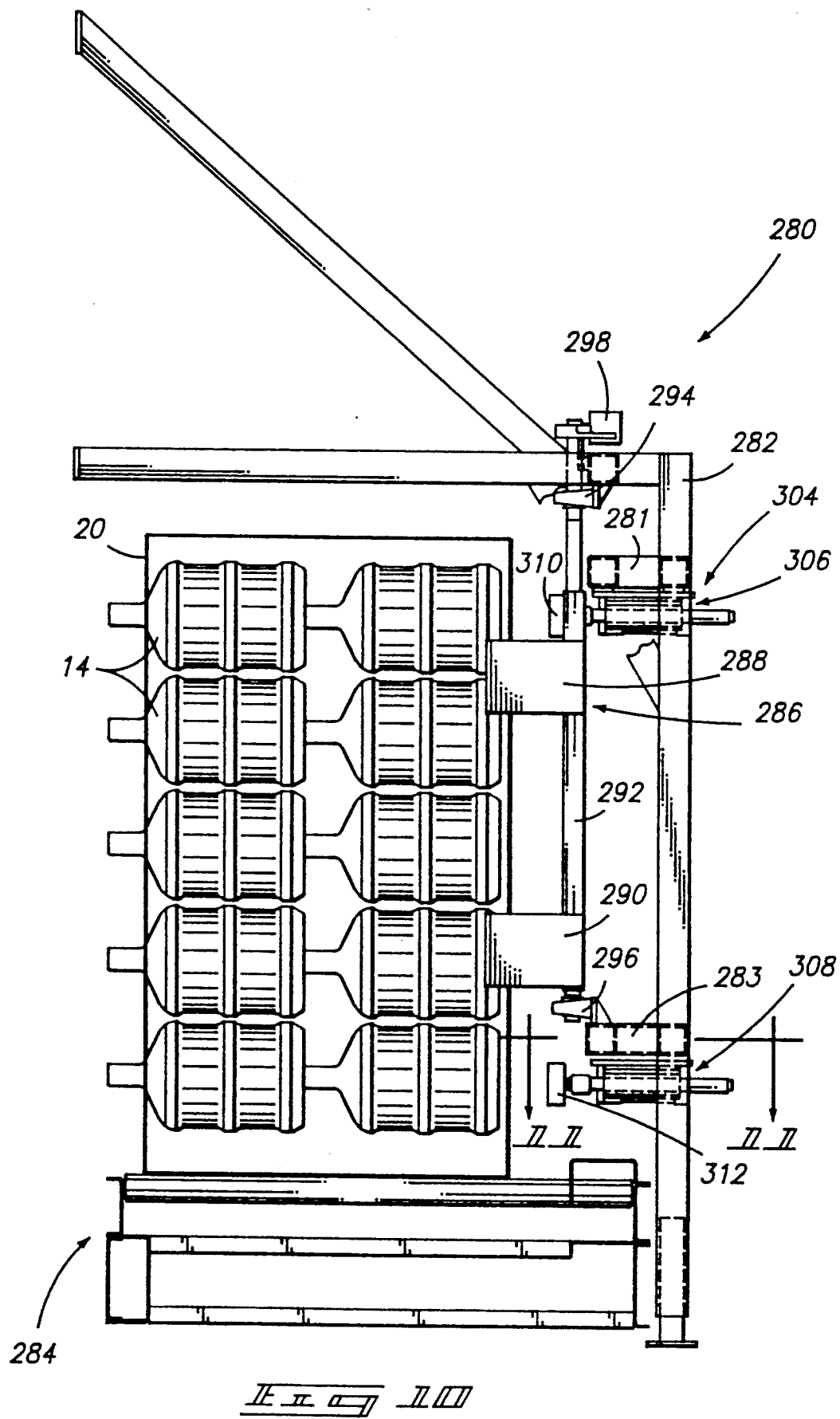

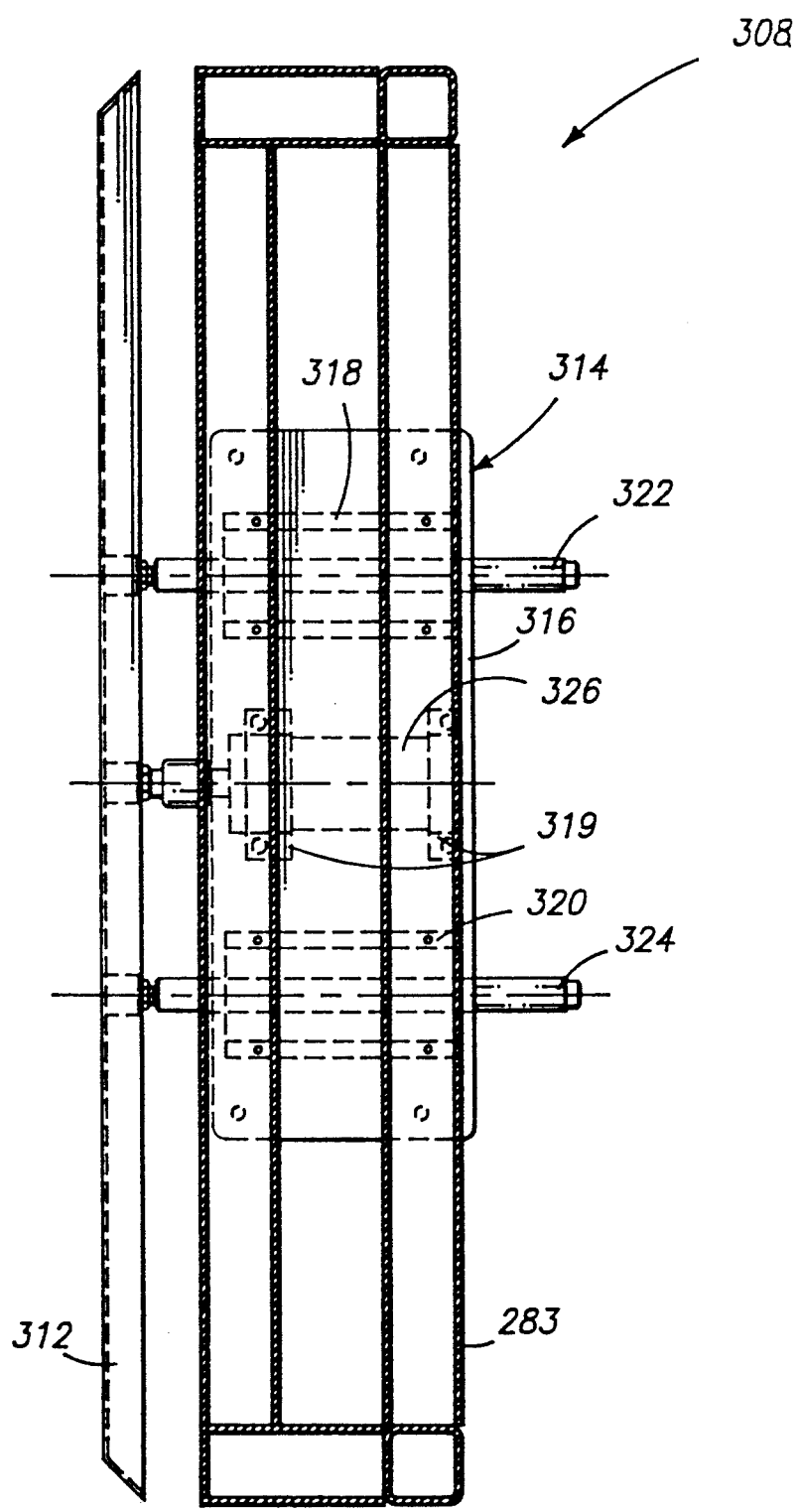

APPARATUS AND METHOD FOR PACKING CONTAINERS ONTO A RACK

TECHNICAL FIELD

This invention relates to container rack packers, particularly to rack packers for large water bottles.

BACKGROUND OF THE INVENTION

Goods (such as foods, liquids, or other consumer items) are typically packaged in cases, boxes, bags, bottles, cans or other containers for ease of transportation and handling. Containers vary considerably in size, weight, and shape. Large containers are often transported in vans, trucks, or trains on specially designed racks which prevent the containers from sliding or rolling into one another or otherwise being damaged in transport.

Loading containers onto transportation racks is an onerous task. Many companies use workers to load one container at a time onto the racks. Unfortunately, using manual labor is expensive and time consuming. Furthermore, the workers may be incapable of lifting some containers which are too large and heavy.

One particular area in which loading individual containers onto a rack is difficult is in the area of bottled water. A full water bottle weighs approximately 45 pounds. Manually loading hundreds of 45 pound water bottles each day is an immensely strenuous chore.

Accordingly, there is a need to mechanically load containers (such as water bottles) onto a rack. One mechanical device used to load water bottles onto a rack is described in U.S. Pat. No. 4,929,140 to Baker. Baker discloses a loader for handling an entire column of water bottles (for example, five vertically aligned water bottles) from a conveyor into the rack. The water bottles are arranged on the conveyor in a row and are vertically oriented. The loader includes a transfer table located adjacent to the conveyor. The transfer table is pivotally mounted at one end and has an axis of rotation which is perpendicular to the row of water bottles on the conveyor. The row of water bottles are loaded from the conveyor onto the transfer table. The loader further includes a large cylinder which lifts the transfer table and swings the table about its axis of rotation to transfer the water bottles from a row of vertical orientation to a column of horizontal orientation. The column of horizontally oriented water bottles are then pushed into the water bottle rack.

The Baker rack packer, however, is difficult to control from a systems perspective. The Baker packer requires numerous actuatable pistons or cylinders for moving bottles onto the transfer table, lifting the table, and pushing individual bottles from the transfer table. Controlling the independent operation of each cylinder in proper synchronization is a formidable control problem. Additionally, the Baker rack packer loads the water bottles neck first onto a rack. The bottles are therefor loaded into one side of the rack and removed from the opposite side. As a result, structurally, more sophisticated racks must be employed to accommodate the Baker rack packer.

The present invention provides an alternative approach to Baker. The present invention is capable of loading rows of containers onto corresponding rows of the rack in an efficient manner without damaging the containers.

BRIEF DESCRIPTION OF THE DRAWINGS

Preferred embodiments of the invention are described below with reference to the following accompanying drawings.

FIG. 7 is a back elevation view taken 90° removed from the side view shown in FIG. 6. FIG. 7 illustrates the containers being transversely spread to a horizontal spacing which corresponds to container-receiving slots on an awaiting rack.

FIG. 8 is an enlarged sectional view of a bridge means positioned on the elevator which extends from the elevator to support the containers as they are moved from the elevator to an awaiting rack.

FIG. 9 is a top plan view of an elevator and a rack positioner and illustrates the positioning and fixing of a water bottle rack for loading.

FIG. 10 is a side elevation view of the rack positioner shown in FIG. 9.

FIG. 11 is a sectional view taken along section line 10—10 in FIG. 10.

DETAILED DESCRIPTION OF THE PREFERRED EMBODIMENTS

This disclosure of the invention is submitted in furtherance of the constitutional purposes of the U.S. Patent Laws "to promote the Progress of Science and useful Arts" (Article 1, Section 8).

Figure 1:
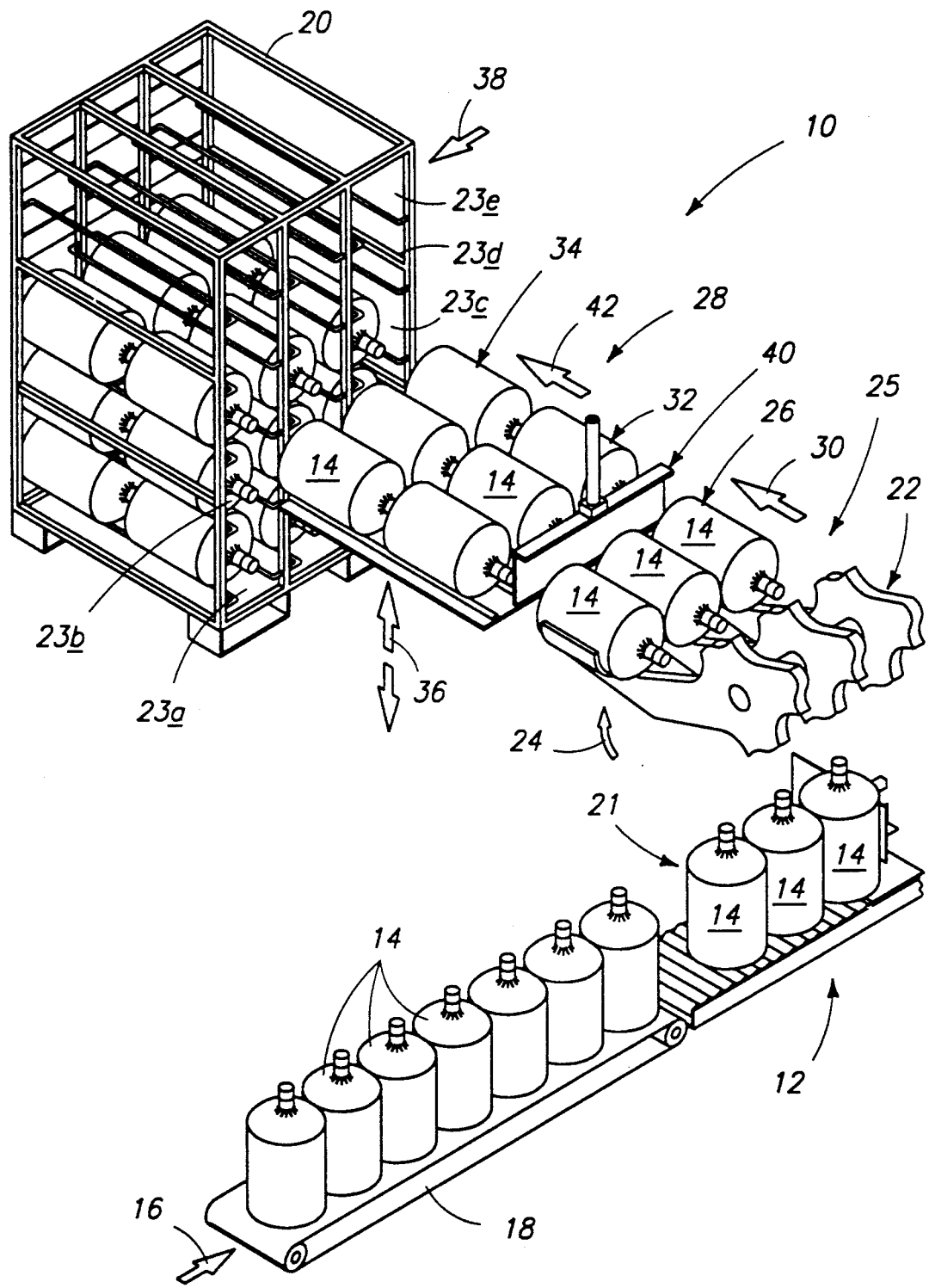
FIG. 1 is a diagrammatical illustration of a rack packer in accordance with the present invention.

The operation and function of a rack packer according to the present invention is first briefly summarized with reference to FIG. 1. After this introduction, the present invention will be described in more detail with reference to the remaining figures. The same reference numerals are used to represent the same components or features throughout the figures.

General Description of the System

FIG. 1 is a diagrammatical illustration of a rack packer 10 for loading rows of containers onto a rack 20 in accordance with the present invention. The preferred embodiment of the present invention is described in conjunction with loading water bottles onto a water bottle rack. The rack packer of the present invention may be used, however, to pack other types of containers besides water bottles into racks.

Racks carrying empty water bottles are brought to the rack packer location. The water bottles are unloaded from the racks downstream of the rack packer. The water bottles are washed and refilled with fresh water. The empty racks are then sequentially moved to the rack packer 10.

Rack packer 10 includes a loading station 12, a transfer station 25, an elevator 28, and a rack positioner and conveyor system (not shown). An empty rack 20 is carried by the conveyor system in a direction indicated by arrow 38 and is temporarily held in place adjacent to elevator 28. Conveyor 18 transports successive rows of filled water bottles 14 in a direction indicated by arrow 16 to loading station 12. Water bottles 14 are linearly aligned and vertically oriented on conveyor 18 and on loading station 12. Preferably, conveyor 18 transports successive rows 21 of three water bottles 14 onto loading station 12 because there are three container-receiving slots in each row on rack 20.

Rack packer 10 has a transfer means 22 positioned at transfer station 25. Transfer means 22 engages row 21 of three water bottles 14 at the loading station 12 and moves (as illustrated by upward curving arrow 24) the water bottles from their vertical positions at loading station 12 upwardly to horizontal positions above loading station 12. The horizontally positioned water bottles are shown as row 26.

Row 26 of horizontally positioned water bottles 14 are moved from transfer means 22 to elevator 28 as indicated by arrow 30. Elevator 28 is designed to accommodate two rows 32 and 34 of horizontally oriented water bottles 14 because rack 20 holds two rows of water bottles at each rack level. Of course, elevator 28 may be designed to accommodate one row, three rows, or more depending upon the depth of the rack and the size of the containers.

Elevator 28 vertically transports (as indicated by arrows 36) rows 32 and 34 of water bottles 14 to elevations corresponding to the five levels 23a-23e of rack 20. Elevator 28 only moves to an unfilled rack level after two rows of bottles have been loaded thereon from transfer means 22 at transfer station 25. Elevator 28 includes sweeping means 40 which simultaneously discharges both rows 32 and 34 of water bottles 14 from elevator 28 in a direction illustrated by arrow 42 onto rack 20. Elevator 28 preferably loads rack 20 from the bottom to the top although other loading sequences are possible.

Loading Station

Figure 2:
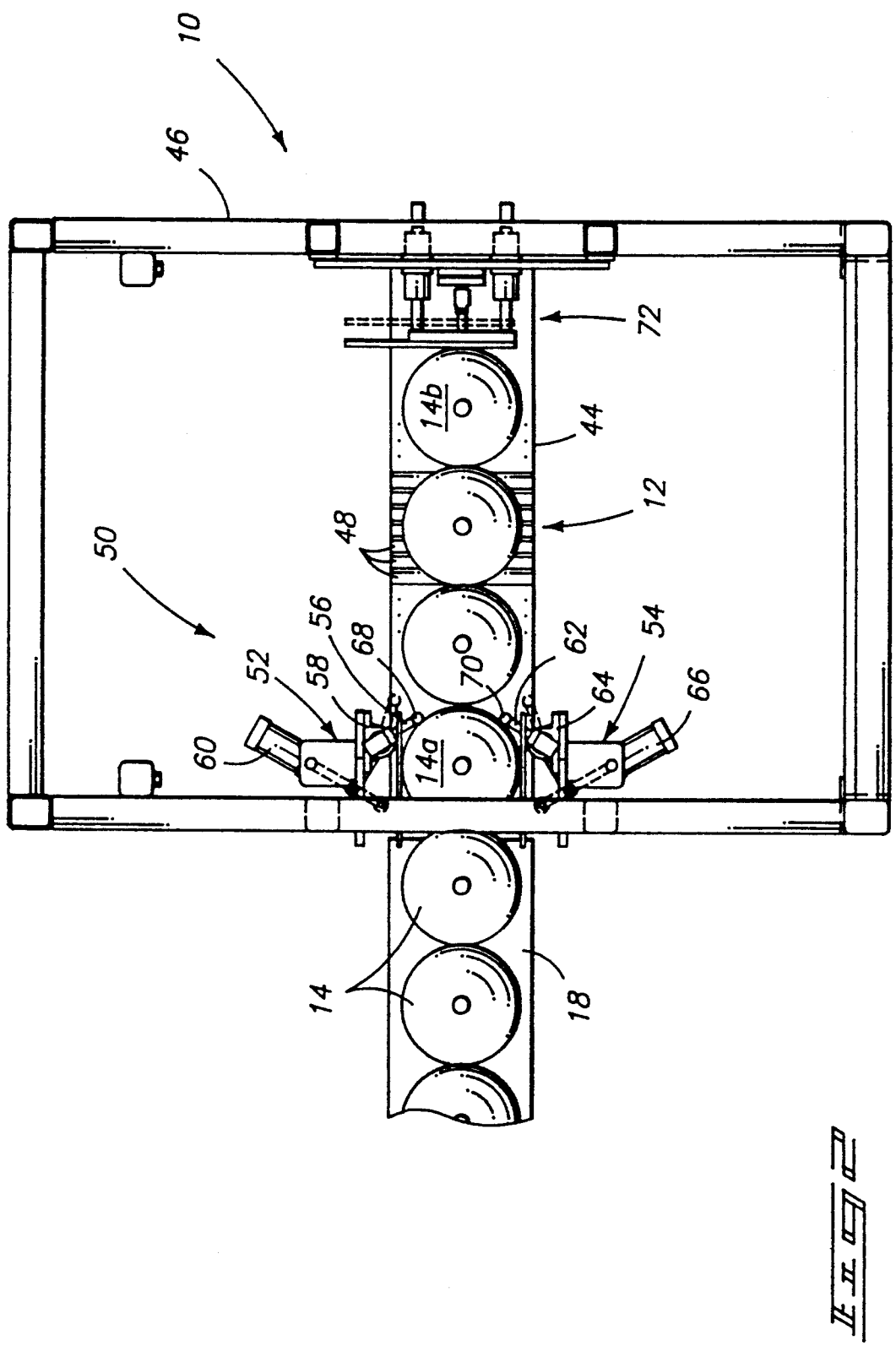
FIG. 2 is a top plan view of a loading station which supports successive incoming rows of vertically oriented water bottles.
Figure 3:
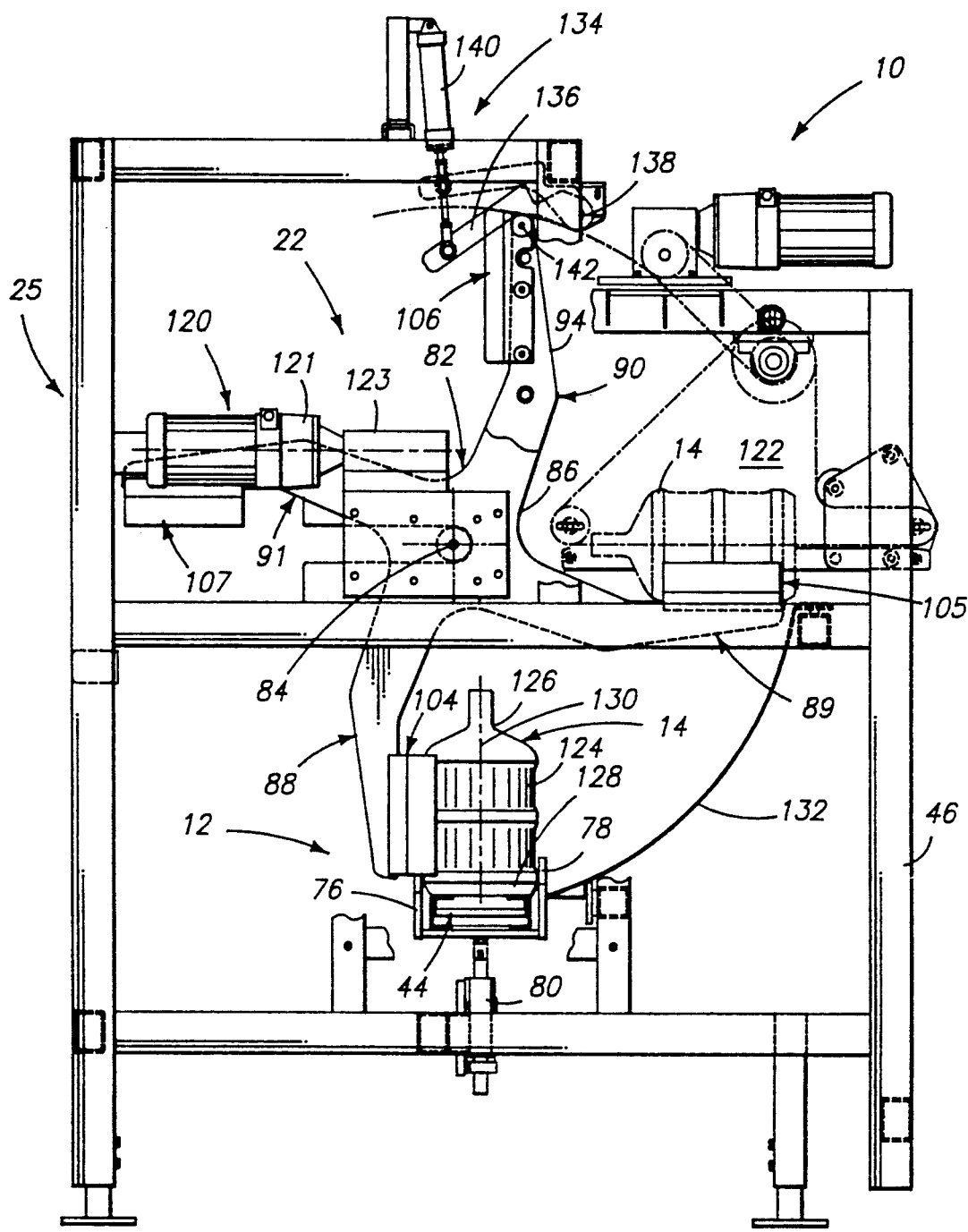
FIG. 3 is a side elevation view of a starwheel mounted at a transfer station and illustrates the operation of the starwheel to move a row of water bottles from vertical positions at the loading station to horizontal positions.

FIGS. 2 and 3 show loading station 12 of rack packer 10 according to a preferred embodiment of the present invention. At loading station 12, the rack packer includes a platform 44 mounted to a frame 46. Platform 44 is positioned upstream from conveyor 18 to receive successive rows of vertically oriented water bottles 14. Platform 44 has multiple guide rollers 48 which rotate freely to move water bottles 14 along platform 44.

The rack packer also includes conveyor gate means 50 which stops the flow of incoming water bottles 14 from conveyor 18. Conveyor gate means 50 opens periodically to allow successive rows of three water bottles to slide onto platform 44. Conveyor gate means 50 includes two actuatable gates 52 and 54 mounted to frame 46 on opposite sides of platform 44. Gate 52 has an arm 56 which is pivotally mounted in bracket 58 and rotatable by cylinder 60. Similarly, gate 54 has an arm 62 which is pivotally mounted in bracket 64 and rotatable by cylinder 66. Arms 56 and 62 pivot between a closed position (shown in solid line) and an open position (shown in phantom). Arms 56 and 62 preferably include respective vertical rods 68 and 70 which extend partially along the sides of the next water bottle 14 (referenced with numeral 14a) to be moved onto platform 44. Rods 68 and 70 extend into the paper in the top plan view of FIG. 2.

When arms 56 and 62 are in their closed position (as shown), the water bottles behind conveyor gate means 50 on conveyor 18 are prevented from being pushed onto platform 44 at loading station 12. When arms 56 and 62 are pivoted to their open positions (as shown in phantom), the water bottles are shifted from conveyor 18 onto platform 44 and roll along guide rollers 48.

Rack packer 10 has a backstop 72 positioned at loading station 12 which stops the movement of water bottles 14 in a desired location on platform 44. Backstop 72 is mounted to frame 46 above platform 44. Backstop 72 has a flat wall 74 which engages lead water bottle 14b. Backstop 72 stops the row of water bottles near the center of frame 46 in preparation for moving the row of water bottles from loading station 12 to the elevator. Wall 74 is retractable to the position shown in phantom.

Rack packer 10 has two retractable side walls 76 and 78 (FIG. 3) positioned on opposite sides of and extending above platform 44. Side walls 76 and 78 guide and align the incoming successive rows of water bottles onto platform 44. Side walls 76 and 78 can be lowered to a position in which the tops of the side walls are substantially level with the top of platform 44. A side wall control cylinder 80 raises and lowers the side walls 76 and 78 as desired.

Transfer Station

Figure 4:
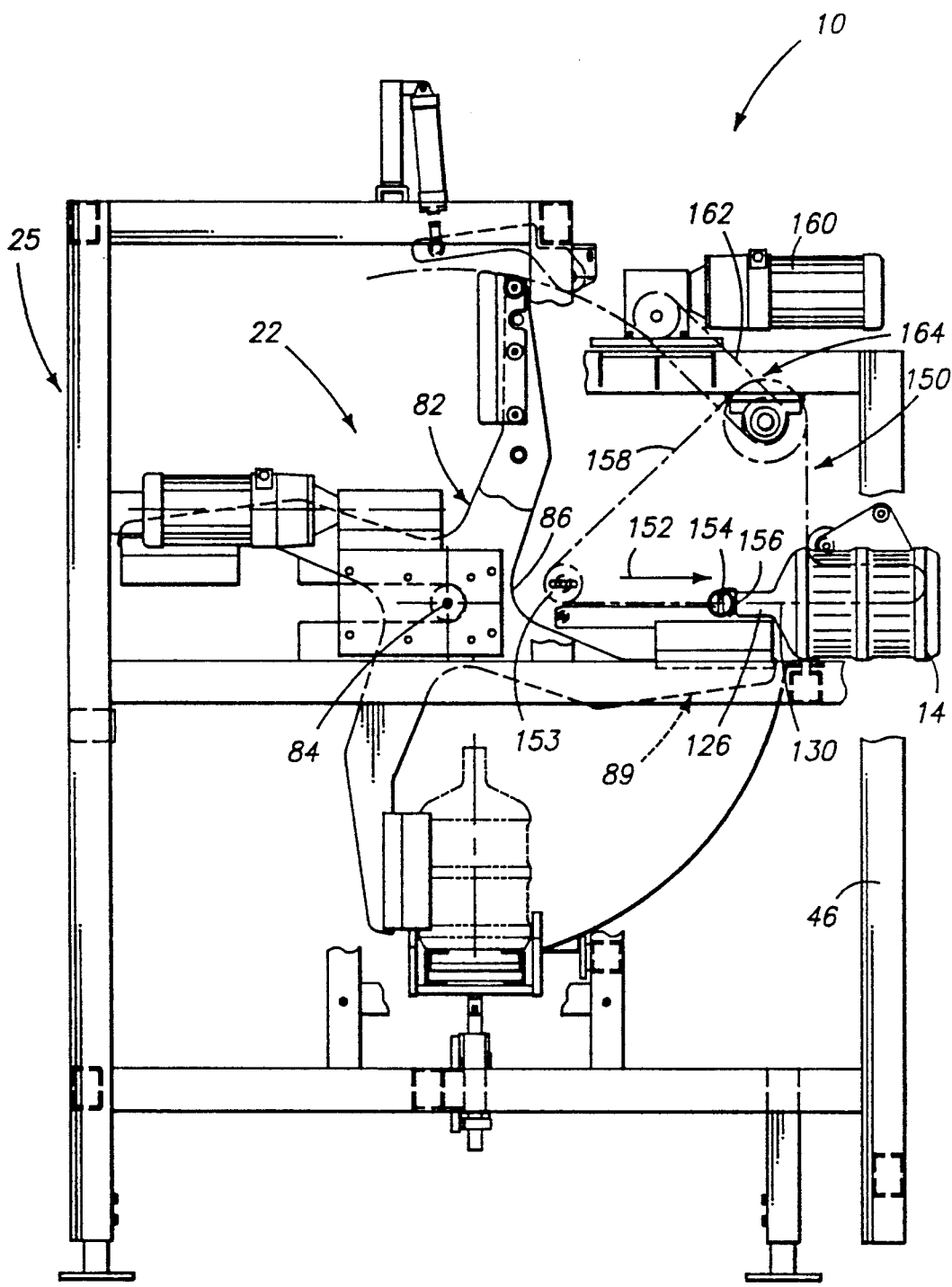
FIG. 4 is a side elevation view of the starwheel and illustrates a row of water bottles being discharged from the starwheel.
Figure 5:
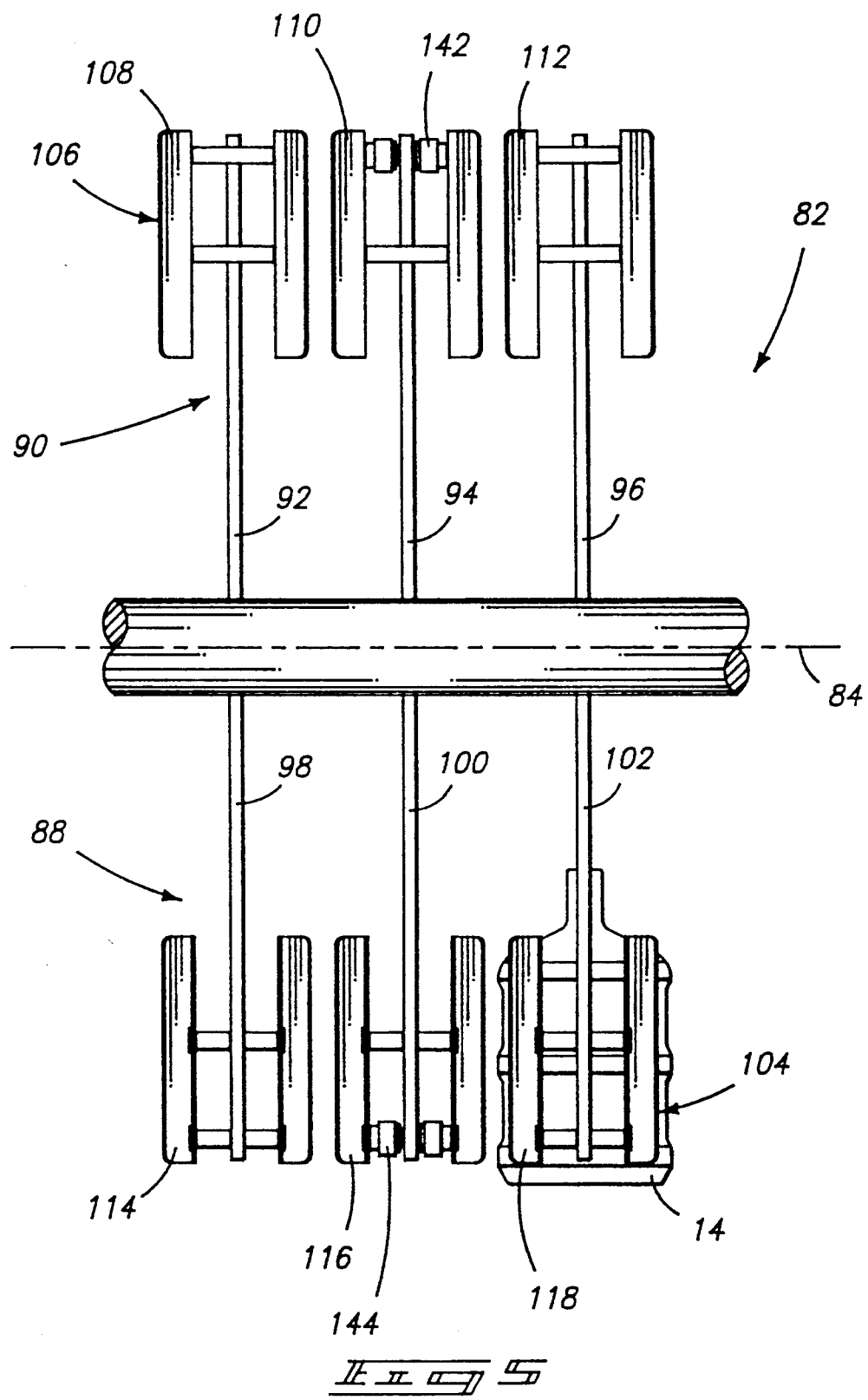
FIG. 5 is a front elevation view of the starwheel.

FIGS. 3 and 4 show transfer station 25 of rack packer 10 in accordance with a preferred embodiment of the present invention. Transfer station 25 is positioned adjacent to and substantially above loading station 12. Rack packer 10 includes transfer means 22 for moving successive rows of water bottles 14 from their vertical positions at loading station 12 upwardly to their horizontal positions above loading station 12. In the preferred embodiment, transfer means 22 includes a starwheel 82 which is rotatably mounted about transfer axis 84 to frame 46. Transfer axis 84 (which extends into the drawing in FIGS. 3 and 4) is parallel to the row of water bottles 14 at loading station 12. Starwheel 82 has a hub 86 located at transfer axis 84 and four sets of angularly-spaced radial arms 88, 89, 90, and 91 extending from hub 86. The sets of radial arms 88-91 are preferably evenly spaced at substantially 90° angles around hub 86, as shown. Each set of radial arms comprises a row of three radial arms aligned in a direction parallel to transfer axis 84. As shown in FIG. 5, set 90 has three radial arms 92, 94, and 96 and set 88 has three radial arms 98, 100, and 102. Sets 89 and 91 are not shown in FIG. 5 to promote clarity.

Starwheel 82 has multiple sets of cradles, referenced generally as 104, 105, 106, and 107 (FIGS. 3 and 4). The cradles are mounted on portions of the radial arms 88-91 which are distal from hub 86. One cradle is provided on each radial arm at each set of arms. As shown in FIG. 5, cradles 108, 110, and 112 are mounted on respective arms 92, 94, 96 and cradles 114, 116, and 118 are mounted on respective arms 98, 100, and 102. Cradles 108-118 have a crescent shape which is compatible with the shape of water bottles 14. The shape of the cradles may, however, be changed to accommodate shapes of other containers if desired.

Each radial arm and cradle combination supports an individual water bottle. In this manner, starwheel 82 transfers a row of three water bottles with each 90° rotation. The starwheel may be constructed to have more or less than three radial arms per set. For example, if the bottle rack has four bottle slots in each row, it would be advantageous to construct a starwheel having four radial arms in each row.

As shown in FIG. 3, starwheel 82 is rotated about transfer axis 84 by drive means 120. Drive means 120 includes a motor 121 and a transmission 123. Starwheel 82 moves each row of water bottles 14 from loading station 12 upwardly to a location referenced as 122. Each bottle 14 has a side surface 124 extending between an upper end 126 and a lower end 128. The upper and lower ends are arranged along a container axis 130. Radial arms 88 of starwheel 82 engage side surfaces 124 of water bottles 14 and push the water bottles from their vertical positions at loading station 12 to their horizontal positions at location 122. Radial arms 88 apply pushing forces to water bottles 14 in a direction perpendicular to their container axes 130.

Rack packer 10 has a concave guiding surface 132 at transfer station 25 which is centered on the transfer axis 84. Surface 132 supports and directs each row of water bottles 14 along an arcuate path about transfer axis 84 as starwheel 82 moves the water bottles. Upper ends 126 of water bottles 14 are maintained in radial positions facing inwardly toward transfer axis 84. Lower ends 128 of water bottles 14 slide along surface 132. Surface 132 keeps water bottles 14 in position on cradles 104 to prevent the bottles from sliding radially outward from transfer axis 84 as the starwheel 82 is rotated.

Starwheel 82 is rotated by drive means 120 in intermittent 90° intervals. Starwheel 82 initially accelerates to move water bottles 14 from their vertical positions at loading station 12 and then decelerates when water bottles 14 reach their horizontal positions at location 122. The starting and stopping of starwheel 82 is necessary to permit the removal of water bottles 14 from the starwheel at location 122, as will be described below in more detail. Starwheel 82 is preferably formed of quarter inch steel and has significant inertia when rotating about transfer axis 84. Accordingly, decelerating the starwheel at the end of each 90° rotation is a formidable task.

To assist in decelerating starwheel 82 at the end of a 90° interval, rack packer 10 has an energy absorbing means 134 at transfer station 25 which reduces rotational momentum of starwheel 82. Energy absorbing means 134 comprises an elbow-shaped member 136 and a cylinder 140. Member 136 is pivotally mounted to frame 46 at pivot 138. Cylinder 140 is mechanically coupled to member 136 at an end opposite of pivot 138. Cylinder 140 moves member 136 about pivot 138 between an engagement position (shown in solid line) and a retracted position (shown in phantom). Each middle radial arm of sets 88-91 has cam rollers mounted thereon. As shown in FIG. 5, middle radial arms 94 and 100 have respective cam rollers 142 and 144.

Member 136 of energy absorbing means 134 is pivoted to its engagement position before the starwheel completes its rotational interval. The cam rollers mounted on the middle radial arm of starwheel 82 engage member 136 to decelerate the starwheel. Member 136 is then pivoted back to its retracted position before starwheel 82 begins its next 90° rotation. Energy absorbing means 134 helps preserve and extend the life of drive means 120. Without the energy absorbing means, motor 121 and transmission 123 would undergo significant strain when stopping the starwheel.

FIG. 4 illustrates the steps of unloading a row of water bottles from starwheel 82 to the elevator (not shown, but located to the right of the starwheel in FIG. 4) or some other receiving station. Rack packer 10 includes a pushing means 150 mounted to frame 46. Pushing means 150 shifts successive rows of horizontally positioned water bottles 14 in a direction parallel to their axes 130 away from transfer axis 84 (as indicated by arrow 152). In the preferred embodiment, pushing means 150 comprises a cylindrical bar 154, a chain 158, a motor 160 and a drive coupling 162. Bar 154 extends across a row of water bottles 14 and has a substantially flat surface 156 which engages upper ends 126 of the water bottles. Bar 154 is connected to chain 158 and is maneuvered around a loop defined by chain 158. Motor 160 and drive coupling 162 power chain 158 and bar 154.

The loop defined by chain 158 lies partially inside and partially outside of a circumferential path defined by the rotating radial arms 88-91 of starwheel 82. Bar 154 has a rest position 164 outside of the circumferential path (the bar is shown at its rest position in FIG. 3). Rest position 164 is outside of the circumferential path of radial arms 88-91 to permit starwheel 82 to rotate freely without contacting bar 154. Bar 154 travels from its rest position 164 initially towards transfer axis 84, around sprocket 153, and radially outward from transfer axis 84. Bar 154 continues radially outward to engage and discharge the row of horizontally positioned water bottles 14 from the starwheel. Bar 154 continues along the loop until it eventually returns to its rest position 164 to await the next row of water bottles. Pushing means 150 includes a limit switch (not shown) which ensures that bar 154 has returned to rest position 164 before starwheel 82 is rotated the next 90° interval.

Elevator

Figure 6:
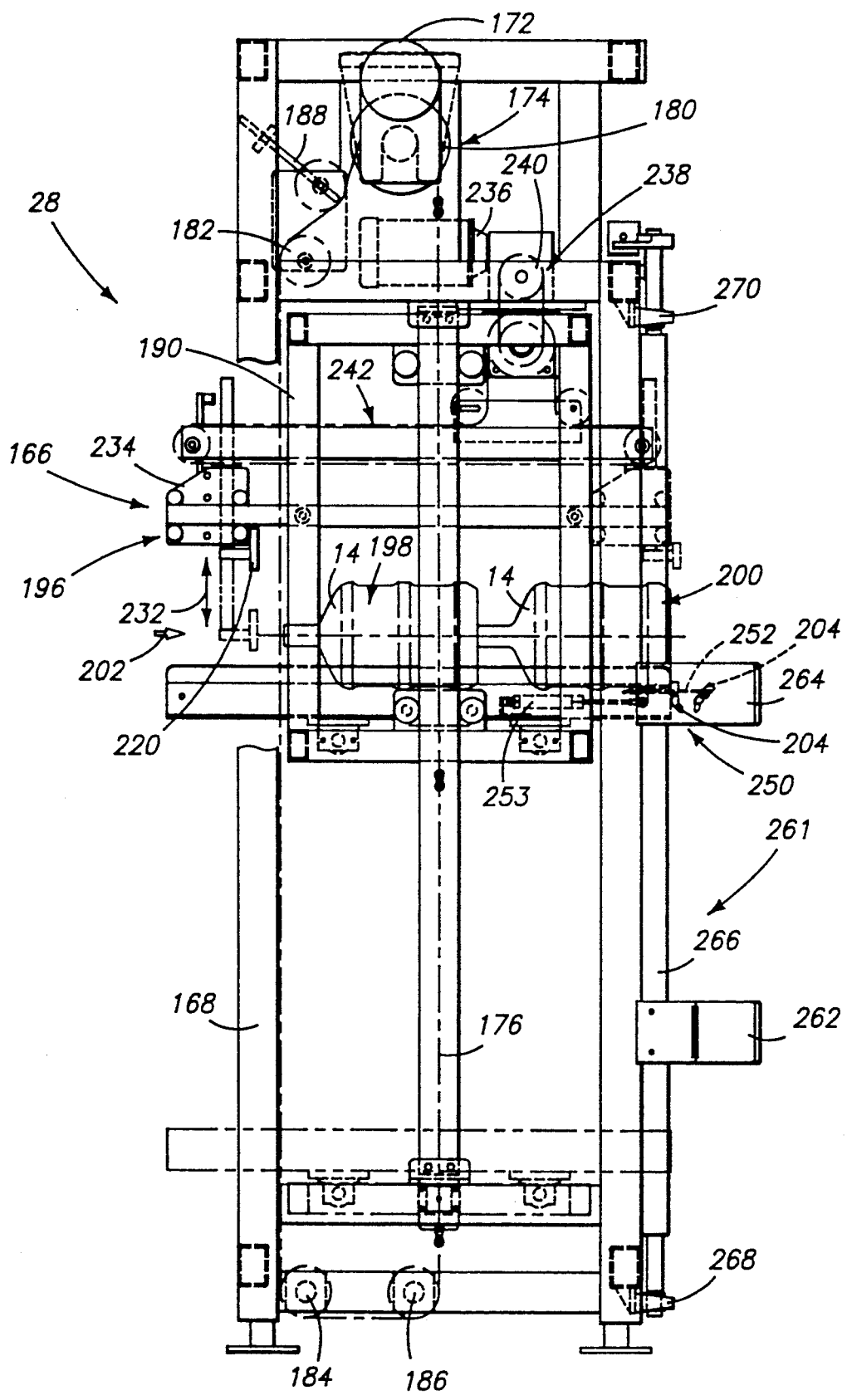
FIG. 6 is a side elevation view of an elevator which receives water bottles from the starwheel and transports the water bottles to desired elevations corresponding to elevations of an empty rack level of an awaiting rack.

FIGS. 6 and 7 show an elevator 28 constructed in accordance with the preferred embodiment of the present invention. Elevator 28 has an elevator platform 166 which is vertically movable within an elevator frame 168. Platform 166 is mounted to frame 168 on guide wheels 170 (FIG. 7). The guide wheels facilitate vertical movement, but prevent horizontal side-to-side movement. Elevator 28 also includes a motor 172 and drive coupling 174 which raise and lower platform 166 within frame 168. Drive coupling 174 comprises chains 176 and 178 which form identical loops about upper sprockets 180 and 182 and lower sprockets 184 and 186 (FIG. 6). Drive coupling 174 also includes tensioner 188 which applies tension to chain 176. A similar tensioner (not shown) applies tension to chain 178.

Platform 166 has a car frame 190 which supports three elevator cradles 192, 193, and 194 (FIG. 7). Elevator cradles 192-194 have a crescent shape which is complementary to the round shape of water bottles 14. Elevator cradles 192-194 support two adjacent rows 198 and 200 of water bottles 14 (FIG. 6).

Successive rows of water bottles are shifted from starwheel 82 at transfer station 25 onto elevator cradles 192-194 in a direction represented by arrow 202 in FIG. 6. Elevator 28 has rotatable stop fingers 204 which limit the extent to which rows 198 and 200 of containers 14 are shifted onto elevator cradles 192-194. Stop fingers 204 are described in more detail below with reference to FIG. 8.

After two rows 198 and 200 of water bottles 14 are loaded onto cradles 192–194, the cradles are transversely spread apart from one another (FIG. 7) to a horizontal spacing which corresponds to container-receiving slots on a water bottle rack. Outside elevator cradles 192 and 194 have collars 206 and cylinders 210. Only one collar 206 and one cylinder 210 are shown connected to respective outside elevator cradles 194 and 192 for illustration purposes; but, both cradles have identical structures. Collars 206 are slidably coupled to rods 208 which are securely mounted to car frame 190. Cylinders 210 horizontally spread outside cradles 192 and 194 along over the rods. Middle elevator cradle 193 is connected directly to car frame 190 and is not laterally movable. Outside water bottles, referenced as 14c and 14d, have respective central axes 212 and 214 before being spread horizontally outward. Water bottles 14c and 14d are spread outward to a location shown in phantom with new central axes 216 and 218.

Elevator 28 also has sweep means 196 operably mounted to elevator car frame 190. Sweep means 196 is provided on platform 166 to slide rows 198 and 200 from the elevator to an awaiting rack (not shown). As shown in FIG. 7, sweep means 196 comprises a carriage 234 which supports cylinder 226, guide rods 228 and 230, support bar 224, and three pads 220, 221, and 222. Pads 220–222 are mounted in a spaced relation along support bar 224. Outside pads 220 and 222 are arranged centrally over axes 216 and 218 of the outwardly shifted water bottles 14c and 14d. Cylinder 226 is connected to pad 221 and/or support bar 224 to raise and lower the three pads 220–222. Guide rods 228 and 230 guide the outer ends of support bar 224 and outer pads 220 and 222 as the cylinder raises and lowers the pads. Guide rods 228 and 230 also prevent support bar 224 from rotating or twisting about cylinder 226.

As shown in FIG. 6, pads 220–222 can be vertically raised and lowered as indicated by arrow 232 between an up position (shown in solid line) and a down position (shown in phantom). Carriage 234 moves horizontally from one end of the platform 166 to the other end (shown in phantom) over cradles 192–194. Sweep means 196 includes a motor 236 and drive 238 while power carriage 234 back and forth across elevator cradles 192–194. Drive 238 comprises belt and pulleys 240 and chain and sprockets 242.

As shown in FIG. 6, rack packer 10 has a bridge means 250 mounted to car frame 190 which extends from elevator platform 166 toward an awaiting rack to support the water bottles as they are moved from the elevator 28 to the rack. Bridge means 250 preferably comprises three extendible platforms 252 positioned beneath corresponding cradles. Bridge means 250 further comprises cylinders 253 which are connected to respective platforms 252 to extend and retract the platforms 252.

FIG. 8 shows an enlarged top plan view of one of the extendible platforms 252 of bridge means 250. Platform 252 is slidably supported within C-shaped parts 255 and 257 which are fastened to the frame. Platform 252 has a body 254 and two projections 256 and 258 protruding from the body. Stop finger 204 is rotatably mounted about pin 260 between projections 256 and 258. Pin 260 is fastened to projections 256 and 258. Platform 252 can be extended from the elevator (as shown in phantom) by cylinder 253.

When platform 252 is in its extended position, stop finger 204 is free to rotate about pin 260 and is biased to rest at an approximately 45° angle as shown in phantom in FIG. 6. As a result, stop finger 204 will lie flat along platform 252 under the weight of the water bottles when the rows of water bottles 14 are shifted from elevator 28 to the bottle rack. On the other hand, when platform 252 is in its retracted or non-extended position, stop finger 204 is held against frame 168 of elevator 28 in a vertical position. Stop finger 204 prevents the water bottles 14 from being pushed too far through elevator platform 166 when the water bottles are shifted onto the elevator from the starwheel.

As shown in FIGS. 6 and 9, elevator 28 further comprises rack front holding means 261 mounted to frame 168 for holding the front end of a water bottle rack (shown in dashed line in FIG. 9) during loading. Holding means 261 comprises two rotatable clamping arms 263 and 265 positioned at the corners of elevator 28. Each clamping arm has paddles 262 and 264 connected in a spaced relation to a vertical rod 266. Paddles 262 and 264 engage the sides of bottle rack 20. Rods 266 are rotatably connected to frame 168 by brackets 268 and 270. Each clamping arm 263, 265 further comprises a cylinder 272 which rotate rod 266 and paddles 262 and 264 between a clamped position (shown in solid line in FIG. 9) and an open position (shown in phantom in FIG. 9).

The preferred embodiment of the present invention has been described as transferring water bottles from the starwheel to an elevator. However, the present invention contemplates transferring the water bottles or other containers from the starwheel to other receiving stations, instead of an elevator.

Rack Positioning Means

FIGS. 9–11 show a rack positioning means 280 constructed in accordance with the preferred embodiment of the present invention. Rack positioning means 280 is positioned adjacent to and spaced from elevator 28 such that a rack may be moved therebetween. Rack positioning means 280 is provided to hold the rack in a desired position during loading. As shown in FIG. 10, successive racks are sequenced into rack positioning means 280 by a rack conveyor system 284. Upon completion of the loading of a full rack, rack conveyor system 284 transfers the rack away from rack positioning means 280 and simultaneously transfers an unloaded rack into rack positioning means 280.

Rack positioning means 280 has a frame 282 constructed over rack conveyor system 284 and preferably connected to elevator 28. Rack positioning means 280 also has rack rear holding means 286 which fixes the back end 23 of rack 20 in place during loading. Rear holding means 286 is very similar to rack front holding means 261 in that it comprises two rotatable clamping arms 287 and 289. Each clamping arm has paddles 288 and 290 connected in a spaced relation to vertical rod 292. Paddles 288 and 290 engage the sides near the back end of bottle rack 20. Rods 292 are rotatably connected to frame 282 by brackets 294 and 296. Each clamping arm 287, 289 also has a cylinder 298 which rotates support paddles 288 and 290 about an axis defined by support rods 292 to engage and disengage the rack.

Rack positioning means 280 has a back bracing means 304 which stabilizes horizontal movement of rack 20 laterally across rack conveyor system 284. Bracing means 304 prevents the rack from sliding away from elevator 28 as water bottles 14 are being loaded onto the rack. Back bracing means 304 comprises an upper bracing device 306 and a lower bracing device 308. Bracing devices 306 and 308 are mounted to respective portions 281 and 283 of frame 282. Bracing devices 306 and 308 have respective extendible pads 310 and 312 which extend to engage the back of rack 20.

FIG. 11 shows lower bracing device 308 in more detail. Lower bracing device 308 comprises pad 312, cylinder 326, guide rods 322 and 324, and frame mount 314. Pad 312 is supported by guide rods 322 and 324 and cylinder 326. Frame mount 314 comprises plate 316 which is securely connected to frame portion 283 and brackets 318, 319, and 320. Cylinder 326 is securely fixed to plate 316 by brackets 319. Guide rods 322 and 324 are slidably connected to plate 316 by brackets 318 and 320, respectively. Cylinder 326 moves pad 312 out and in to engage and disengage the back of rack 20. Guide rods 322 and 324 maintain proper alignment of pad 312 and prevent pad 312 from twisting or rotating about cylinder 326. Upper bracing device 306 is identical to bracing device 308 shown in FIG. 11.

Method of Operation

A method for packing containers into a rack in accordance with one embodiment of the present invention will now be described with reference to the figures. In FIG. 2, successive rows of three vertically oriented water bottles 14 are transported by conveyor 18 to loading station 12. Conveyor gates means 50 ensures that three water bottles 14 are provided in each row. Water bottles 14 slide onto platform 44 across guide rollers 48 when conveyor gate means 50 is open. The bottles move onto loading station 12 partially under the force provided by the line of water bottles behind conveyor gate means 50 and partially under the force of gravity. Water bottles 14 slide across platform 44 until lead water bottle 14b engages wall 74 of backstop 72. At this point, conveyor gate means 50 closes and wall 74 is retracted.

In FIG. 3, side walls 76 and 78 are lowered by sidewall control cylinder 80. Starwheel 82 is rotated about transfer axis 84 by drive means 120 to move water bottles 14 from their vertical positions at loading station 12 upwardly to horizontal positions above loading station 12 at location 122. Cradles 104 mounted to radial arms 88 of starwheel 82 engage side surfaces 124 of water bottles 14 and apply pushing forces thereto in directions perpendicular to container axes 130. Concave surface 132 supports and directs water bottles 14 through an arcuate path about transfer axis 84 so that upper ends 126 of water bottles 14 are maintained in radial positions facing inwardly toward transfer axis 84.

In FIG. 4, after a row of water bottles 14 is transferred to their horizontal positions at location 122, the row of water bottles 14 is pushed from starwheel 82 onto an elevator by pushing means 150. Pushing means 150 is synchronized with the operation of starwheel 82 so that bar 154 begins its travel along the loop defined by chain 158 only after starwheel 82 has come to a rest. Bar 154 travels from a rest position 164 towards transfer axis 84 and then rotates around sprocket 153 to engage and push water bottles 14. Bar 154 moves the bottles in a direction parallel to their axes 130 and away from transfer axis 84 as indicated by arrow 152. Bar 154 then returns to its rest position 164 and awaits the next 90° rotation of starwheel 82.

In FIG. 6, two rows 198 and 200 of water bottles 14 are pushed from starwheel 82 onto elevator 28 in the direction indicated by arrow 202. Two rows of bottles are desired because rack 20 is designed to accommodate two rows at each vertical rack level. Stop fingers 204 limit the travel of the bottles being pushed onto platform 166. Elevator platform 166 is then vertically raised and lowered to a desired elevation corresponding to the elevation of an empty rack level on rack 20. As platform 166 is moving to the desired elevation, outside elevator cradles 192 and 194 are spread transversely outward in opposite directions from middle elevator cradle 193 as illustrated in FIG. 7. Pads 220-222 of sweep means 196 are lowered to their down position. When elevator platform 166 reaches the appropriate elevation, bridge platforms 252 are extended toward rack 20 and stop fingers 204 are disengaged. Carriage 234 sweeps across platform 166 to discharge the rows 198 and 200 of bottles from elevator cradles 192-194. The water bottles travel over bridge platforms 252 into an awaiting rack. Platform 166 is returned to an elevation sufficient to receive the next successive rows of water bottles from starwheel 82. Carriage 234 is returned to its original position and pads 220-222 are raised while the platform 166 is returning to the loading elevation.

As shown in FIGS. 9 and 10, a rack 20 is transported to its loading position by rack conveyor system 284. Front rack holding means 261 and rear rack holding means 286 hold rack 20 in proper alignment with elevator 28. Pads 310 and 312 of respective upper and lower bracing devices 306 and 308 extend to engage the back of rack 20. Accordingly, the rack is fixed in position and embraced on three sides during loading. When rack 20 is full, front rack holding means 261, rear rack holding means 286, and back bracing means 304 are disengaged to release rack 20. Rack conveyor system 284 then transports full rack 20 away from rack positioning means 280.

The operation of the rack packer of the present invention is synchronized to promote optimum efficiency.

In compliance with the statute, the invention has been described in language more or less specific as to the structural or methodical features. The invention is not, however, limited to the specific features described or shown, since the means herein disclosed comprise preferred forms of putting the invention into effect. The invention is therefore claimed in any of its forms or modifications within the proper scope of the appended claims appropriately interpreted in accordance with the doctrine of equivalents.

We claim:

1. A rack packer for containers, comprising:
    a loading station which receives and supports successive incoming rows of vertically oriented identical containers, each container having side surfaces extending between upper and lower ends arranged along a container axis;
    transfer means for moving the containers of each row from vertical positions at the loading station upwardly to horizontal positions above the loading station, the transfer means being rotatable about a transfer axis parallel to the successive rows of containers at the loading station;
    drive means for rotating the transfer means to engage the side surfaces of the containers in each row at the transfer station and move the containers from their vertical positions to their horizontal positions; and
    a concave guiding surface centered on the transfer axis to support and direct the containers along an arcuate path about the transfer axis as the transfer means moves the containers from their vertical positions to their horizontal positions, the lower ends of the containers slidably contacting the surface.

2. A rack packer according to claim 1 wherein the transfer means applies pushing forces to the containers in a direction perpendicular to the container axes.

3. A rack packer according to claim 1 wherein the transfer means comprises a starwheel rotatably mounted about the transfer axis, the starwheel having a hub located at the transfer axis and multiple sets of angularly-spaced radial arms extending from the hub to support the individual containers of each successive row.

4. A rack packer according to claim 3 wherein the starwheel has four sets of radial arms evenly spaced at substantially 90° angles around the hub, each set of radial arms comprising a row of three radial arms aligned in a direction parallel to the transfer axis.

5. A rack packer according to claim 3 wherein the starwheel has cradles mounted on portions of the radial arms distal from the hub, the cradles having a shape compatible with a shape of the containers, the cradles supporting the containers as the starwheel is rotated by the drive means.

6. A rack packer for containers, comprising:
a loading station which receives and supports successive incoming rows of vertically oriented identical containers, each container having side surfaces extending between upper and lower ends arranged along a container axis;
transfer means for moving the containers of each row from vertical positions at the loading station upwardly to horizontal positions above the loading station, the transfer means being rotatable about a transfer axis parallel to the successive rows of containers at the loading station; and
drive means for rotating the transfer means to engage the side surfaces of the containers in each row at the transfer station and move the containers from their vertical positions to their horizontal positions;
wherein the loading station comprises:
a platform to support successive rows of vertically oriented containers;
retractable sidewalls adjacent to and extending above the platform in an extended position to guide and align the incoming successive rows of containers onto the platform, the sidewalls having a retracted position at least substantially level with the platform to allow the transfer means to move the containers from their vertical positions on the platform to their horizontal positions; and
sidewall control means for raising and lowering the sidewalls between their extended position and their retracted position.

7. A rack packer for containers, comprising:
a loading station which receives and supports successive incoming rows of vertically oriented identical containers, each container having side surfaces extending between upper and lower ends arranged along a container axis;
transfer means for moving the containers of each row from vertical positions at the loading station upwardly to horizontal positions above the loading station, the transfer means being rotatable about a transfer axis parallel to the successive rows of containers at the loading station, the transfer means comprising a starwheel rotatably mounted about the transfer axis, the starwheel having a hub located at the transfer axis and multiple sets of angularly-spaced radial arms extending from the hub to support the individual containers of each successive row; and
drive means for rotating the transfer means to engage the side surfaces of the containers in each row at the transfer station and move the containers from their vertical positions to their horizontal positions while maintaining the upper ends of the containers in radial positions facing inwardly toward the transfer axis.

8. A rack packer according to claim 7 wherein the starwheel has four sets of radial arms evenly spaced at substantially 90° angles around the hub, each set of radial arms comprising a row of three radial arms aligned in a direction parallel to the transfer axis.

9. A rack packer according to claim 7 further comprising a concave guiding surface centered on the transfer axis to support and direct the containers along an arcuate path about the transfer axis as the starwheel moves the containers from their vertical positions to their horizontal positions, the lower ends of the containers slidably contacting the surface.

10. A rack packer for containers, comprising:
a loading station which receives and supports successive incoming rows of vertically oriented identical containers, each container having side surfaces extending between upper and lower ends arranged along a container axis;
a receiving station for supporting successive rows of horizontally oriented containers;
transfer means for moving the containers of each row from vertical positions at the loading station upwardly to horizontal positions above the loading station, the transfer means being rotatable about a transfer axis parallel to the successive rows of containers at the loading station, the transfer means comprising a starwheel rotatably mounted about the transfer axis, the starwheel having a hub located at the transfer axis and multiple sets of angularly-spaced radial arms extending from the hub to support the individual containers of each successive row;
drive means for rotating the transfer means to engage the side surfaces of the containers in each row at the transfer station and move the containers from their vertical positions to their horizontal positions while maintaining the upper ends of the containers in radial positions facing inwardly toward the transfer axis; and
pushing means for engaging the upper ends of the horizontally positioned containers and for shifting the successive rows of containers to the receiving station by moving each row in a direction parallel to their container axes and away from the transfer axis.

11. A rack packer according to claim 10 wherein the starwheel has four sets of radial arms evenly spaced at substantially 90° angles around the hub, each set of radial arms comprising a row of three radial arms aligned in a direction parallel to the transfer axis.

12. A rack packer according to claim 10 wherein the pushing means comprises:
a member extending across a row of horizontally positioned containers, the member having a substantially flat surface for engaging the upper ends of the containers; and means for maneuvering the member around a loop which extends partially inside and partially outside of a circumferential path defined by the rotating radial arms of the starwheel;

the member travelling along the loop from a location exterior to the circumferential path to engage and move the successive rows of the horizontally positioned containers to the receiving station, the member then returning to the location exterior to the circumferential path.

13. A rack packer for containers, comprising:

a loading station which receives and supports successive incoming rows of vertically oriented identical containers, each container having side surfaces extending between upper and lower ends arranged along a container axis;

a transfer station adjacent to the loading station;

a starwheel positioned at the transfer station, the starwheel being rotatably mounted about a transfer axis parallel to the successive rows of containers at the loading station and having multiple sets of angularly-spaced radial arms extending from the transfer axis to support the individual containers of each row while moving them from vertical positions at the loading station upwardly to horizontal positions; and drive means for rotating the starwheel about the transfer axis to move the containers from their vertical positions at the loading station to their horizontal positions while maintaining the upper ends of the containers in radial positions facing inwardly relative to the transfer axis.

14. A rack packer for containers, comprising:

a loading station which receives and supports successive incoming rows of vertically oriented identical containers, each container having side surfaces extending between upper and lower ends arranged along a container axis;

a transfer station adjacent to the loading station;

a receiving station adjacent to the transfer station for supporting successive rows of horizontally oriented containers;

a starwheel positioned at the transfer station, the starwheel being rotatably mounted about a transfer axis parallel to the successive rows of containers at the loading station and having multiple sets of angularly-spaced radial arms extending from the transfer axis to support the individual containers of each row while moving them from vertical positions at the loading station upwardly to horizontal positions;

drive means for rotating the starwheel about the transfer axis to move the containers from their vertical positions to their horizontal positions while maintaining the upper ends of the containers in radial positions facing inwardly toward the transfer axis; and pushing means for engaging the upper ends of the horizontally positioned containers on the starwheel and for shifting the successive rows of containers to the receiving station in a direction parallel to the container axis and away from the transfer axis.

15. A rack packer for containers, comprising:

a loading station which receives and supports successive incoming rows of vertically oriented identical containers, each container having side surfaces extending between upper and lower ends arranged along a container axis;

a transfer station adjacent to the loading station;

a starwheel positioned at the transfer station, the starwheel being rotatably mounted about a transfer axis parallel to the successive rows of containers at the loading station and having multiple sets of angularly-spaced radial arms extending from the transfer axis to support the individual containers of each row while moving them from vertical positions at the loading station upwardly to horizontal positions;

drive means for rotating the radial arms of the starwheel about the transfer axis to engage the side surfaces of the containers in each row at the transfer station and move the containers from their vertical positions to their horizontal positions; and a concave guiding surface centered on the transfer axis supporting and directing the containers along an arcuate path about the transfer axis as the starwheel moves the containers from their vertical positions to their horizontal positions, the lower ends of the containers slidably contacting the surface.

16. A rack packer for containers, comprising:

a loading station which receives and supports successive incoming rows of vertically oriented identical containers;

a transfer station adjacent to the loading station;

a starwheel positioned at the transfer station, the starwheel being rotatably mounted about a transfer axis parallel to the successive rows of containers at the loading station and having multiple sets of radial arms extending from the transfer axis to support the individual containers of each row while moving them from vertical positions at the loading station upwardly to horizontal positions above the loading station;

drive means for rotating the starwheel about the transfer axis;

an elevator located adjacent to the starwheel;

pushing means for moving each row of horizontally oriented containers from the starwheel to the elevator;

rack positioning means for fixing the position of a receiving rack for the containers in alignment with the elevator;

the elevator being vertically movable to transport the successive rows of horizontally oriented containers to elevations corresponding to the elevations of supporting elements on a rack; and sweep means on the elevator for discharging the rows of containers from the elevator to an awaiting rack held by the rack positioning means.

17. A rack packer according to claim 16 wherein the starwheel has a hub located at the transfer axis and four sets of radial arms evenly spaced at substantially 90° angles around the hub.

18. A rack packer according to claim 17 wherein the starwheel has a row of three radial arms in each set of the four sets of radial arms, the row of three radial arms being aligned in a direction parallel to the transfer axis.

19. A rack packer according to claim 16 wherein the starwheel has cradles mounted on portions of the radial arms distal from the transfer axis, the cradles having a shape compatible with a shape of the containers, the cradles supporting the containers as the starwheel is rotated by the drive means.

20. A rack packer according to claim 16 further comprising a concave guiding surface positioned at the transfer station and centered on the transfer axis to support and direct the containers along an arcuate path about the transfer axis as the starwheel moves the containers from their vertical positions to their horizontal positions.

21. A rack packer according to claim 16 wherein the loading station comprises:
   a platform to support successive rows of vertically oriented containers;
   retractable sidewalls adjacent to and extending above the platform in an extended position to guide and align the incoming successive rows of containers on the platform, the sidewalls having a retracted position at least substantially level with the platform to allow the starwheel to move the containers from the vertical positions on the platform to the horizontal positions; and
   sidewall control means for raising and lowering the sidewalls between their extended position and their retracted position.

22. A rack packer according to claim 16 wherein the pushing means comprises:
   a member extending across a row of horizontally oriented containers, the member having a substantially flat surface for engaging the containers; and
   means for maneuvering the member around a loop which extends partially inside and partially outside of a circumferential path defined by the rotating radial arms of the starwheel;
   the member travelling along the loop from a location exterior to the circumferential path to engage and move the successive rows of horizontally oriented containers from the transfer station to the elevator, the member then returning to the location exterior to the circumferential path.

23. A rack packer according to claim 16 wherein the starwheel is rotated by the drive means in substantially 90° intervals, the starwheel initially accelerating to move the containers from their vertical positions and then decelerating when the containers reach their horizontal positions, the rack packer further comprising energy absorbing means for reducing rotational momentum of the starwheel to decelerate the starwheel when the containers reach their horizontal positions.

24. A rack packer according to claim 16 further comprising:
   elevator cradles on the elevator to support at least one row of containers, the elevator cradles each having a shape complementary to the shape of the containers; and
   means for transversely spreading adjacent elevator cradles from one another to a horizontal spacing corresponding to supporting container-receiving slots on a rack.

25. A rack packer according to claim 16 wherein the sweep means comprises:
   multiple pads vertically extendible from retracted positions while the containers are being transferred to the elevator to extended positions; and
   means for vertically moving the pads to their extended positions and for horizontally displacing the extended pads, the pads engaging and discharging the row of containers from the elevator to an awaiting rack.

26. A rack packer according to claim 16 further comprising:
   stop means on the elevator for normally limiting the extent of movement imparted to the containers by the pushing means; and
   bridge means on the elevator for supporting the containers as they are moved from the elevator to an awaiting rack by action of the sweep means, the bridge means being extendible from the elevator toward a rack, the stop means being disengaged when the bridge means is extended from the elevator.

27. A rack packer according to claim 16 further comprising:
   first support paddles on the rack positioning means for holding a back end of a rack; and
   second support paddles on the elevator for holding a front end of a rack.

28. A method for packing containers into a rack comprising the steps of:
   transporting successive rows of vertically oriented identical containers to a loading station, each container having side surfaces extending between upper and lower ends arranged along a container axis;
   engaging the side surfaces of the containers in each row at the loading station with a moving means; and
   moving the containers of each row from vertical positions at the loading station along a concave surface upwardly to horizontal positions above the loading station, the concave surface abutting the lower ends of the containers for guiding the containers along an arcuate path.

29. A method to claim 28 wherein the engaging and moving steps involve the application of pushing forces to the containers in directions perpendicular to the container axes.

30. A method for packing containers into a rack comprising the steps of:
   transporting successive rows of vertically oriented identical containers to a loading station, each container having side surfaces extending between upper and lower ends arranged along a container axis;
   engaging the side surfaces of the containers in each row at the transfer station to apply forces to the containers in a direction perpendicular to the container axes;
   moving the containers of each row from vertical positions at the loading station upwardly about a transfer axis to horizontal positions above the loading station while maintaining the upper ends of the containers in radial positions facing inwardly toward the transfer axis;
   pushing the successive rows of horizontally positioned containers onto an elevator in a direction parallel to their container axes and away from the transfer axis;
   fixing the position of a receiving rack for the containers in alignment with the elevator;
   transporting the successive rows of horizontally oriented containers to elevations corresponding to the elevations of supporting elements on a rack; and
   discharging the rows of containers from the elevator to an awaiting rack.

* * * * *